UNITED STATES PATENT OFFICE.

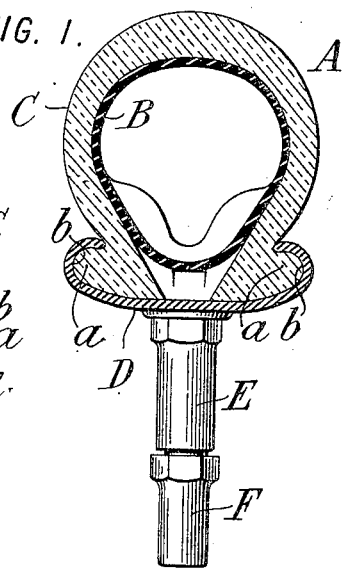
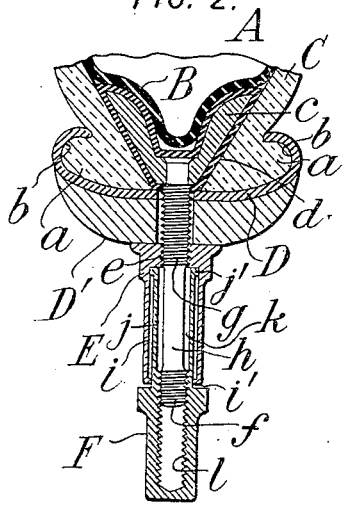
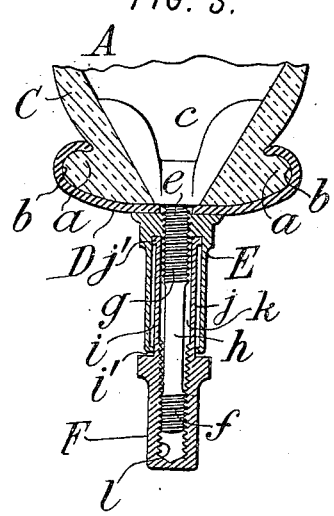
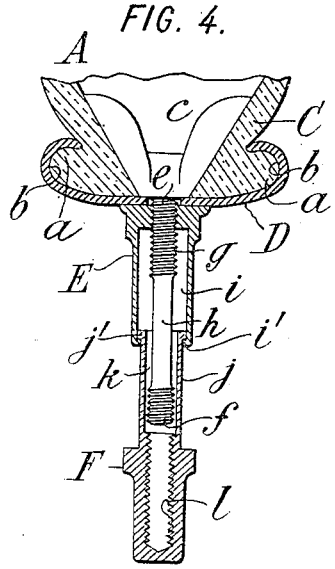
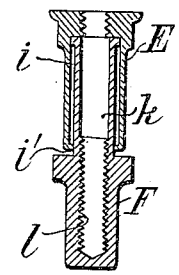

HARRY K. RAYMOND, OF AKRON, OHIO, MAXIMILIAN CHARLES SCHWEINERT, OF WEST HOBOKEN, NEW JERSEY, AND HENRY P. KRAFT, OF NEW YORK, N. Y.

CLAMPING DEVICE FOR PNEUMATIC TIRES.

No. 808,307.  Specification of Letters Patent.  Patented Dec. 26, 1905.

Application filed March 18, 1905. Serial No. 250,769.

*To all whom it may concern:*

Be it known that we, HARRY K. RAYMOND, residing at Akron, in the county of Summit and State of Ohio, MAXIMILIAN CHARLES SCHWEINERT, residing at West Hoboken, in the county of Hudson and State of New Jersey, and HENRY P. KRAFT, residing in the city, county, and State of New York, citizens of the United States, have invented certain new and useful Improvements in Clamping Devices for Pneumatic Tires, of which the following is a specification.

This invention relates to clamping devices for pneumatic tires, and aims to provide certain improvements therein.

Pneumatic tires for automobile or other heavy vehicles are now commonly made with an inner air-tube and an outer shoe, the latter having its edges enlarged to form flanges, which fit within circumferential recesses or channels formed in the wheel-rim, the shoe being held in place by clamping devices disposed at intervals around the rim and having retaining blocks or plates of appropriate shape fitting between the inner edges of the tire-shoe and holding the flanges thereof securely in place within the channels of the rim. In the usual form of such clamping devices the retaining-plates are fitted with long screw-threaded bolts, which pass through the rim and receive nuts which bear against the inner face of the rim and hold the bolts in position.

This invention provides an improved construction of clamping device for use in this connection.

Referring to the drawings, which illustrate our invention as applied to an automobile-tire, Figure 1 is a cross-section of a tire and rim, showing the improved clamping device in elevation. Fig. 2 is a similar view showing the device in section. Fig. 3 is a view similar to Fig. 2, with the inner air-tube omitted, illustrating the adaptability of the device to a different-sized bolt. Fig. 4 is a section corresponding to Fig. 3 and showing the mode of application of the device, and Fig. 5 is a section of the device detached.

Referring to the drawings, let A indicate the pneumatic tire of an automobile or other vehicle, which, as shown, comprises an inner air-tube B and an outer covering or shoe C, the latter being enlarged at its edges to form oppositely-extended flanges $a$ $a$, which are adapted to enter circumferential channels or recesses $b$ $b$, formed in the vehicle-felly. The latter is ordinarily formed either wholly or partly of a steel rim D, having its edges turned inwardly to form the channels $b$ $b$, as shown. The shoe C is held in place upon the rim by suitable clamping devices, which consist of retaining blocks or plates $c$, Fig. 2, of suitable V-shaped or other cross-section, usually incased in a rubber covering $d$ and held in proper position between the edges of the shoe C by means of bolts $e$, passing through the rim. The bolts $e$ are engaged by suitable nuts, which draw them to firm seats upon the rim. When a tire is partially or wholly removed from the rim for repair or otherwise, difficulty is experienced in replacing it unless the bolts $e$ are made of considerable length, and they are hence so proportioned that at least the extreme ends thereof will project through the rim when the retaining-plates are in their outermost positions. The retaining-nuts are usually partially screwed on the bolts during this operation and are used as a sort of temporary handle to draw the plates down into place. For this purpose the inner or free ends of the bolts are screw-threaded, as shown at $f$. The bolts are also necessarily threaded at $g$ near their outer ends to engage the retaining-nuts when the plates are finally adjusted; but the intervening portions of the bolts (indicated at $h$) are preferably left unthreaded and formed of reduced diameter in order that the nuts may pass freely over them without rotation, thus avoiding the necessity of screwing the nuts along the whole length of the bolts.

As shown in the drawings, we provide a main or clamping nut E, which is adapted to screw down against the rim, and a lock-nut F, which is adapted to bear against the nut E to lock it in place. According to our invention the main nut E is capable of being screwed fully home before the lock-nut F engages the thread, so that if for any reason the nuts do not screw easily upon the bolt they may be separately adjusted with the wrench. To accomplish this, we form a telescopic connection between the nuts, preferably counterboring the main nut E to form an enlarged socket $i$ (see Fig. 4) and forming a reduced extension $j$ upon the lock-nut F, which is adapted to enter the socket $i$ and slide freely therein. The extension $j$ is also counterbored at $k$, so that the bolt may pass freely through the latter until it reaches the screw-threaded portion $l$. The parts may be connected so as to permit independent rotation by forming engaging shoulders or flanges $i'$ $j'$ upon the nuts E and F, respectively.

Fig. 4 indicates the position of the parts during the application of the device to the bolt. The nut E, it will be noted, has been screwed fully home to clamp the plate $e$ tightly in place. The lock-nut F is now screwed up until it reaches the position of Fig. 3, where the inner end of the extension $j$ bears against the upper wall of the socket $i$, thus locking the nut E.

It is very desirable that the bolt $e$ shall be protected, so that it shall not be bent or its threads injured in use. This we accomplish in the present construction by suitably proportioning the parts, so that when they are in their closed position they shall be of sufficient length to completely cover the bolt, and to avoid the entrance of dust the outer end of the nut is preferably closed, as shown.

We also prefer to so proportion the device that it shall be capable of use in connection with bolts of varying lengths or varying degrees of projection beyond the rim, usually due to differences in the thickness of the rim. The usual limits of such variations are those indicated in Figs. 2 and 3, in the former of which a thick wood rim D' is used, while in the latter it is omitted. As will be noted, the projection of the bolt is considerably greater in the latter case, which, however, the clamping device is easily capable of accommodating. The effective length of the bolt in Fig. 4 corresponds to that of Fig. 3.

Various modifications may be made in the construction thus described without departing from the spirit of the invention.

We claim as our invention the following-defined novel features, substantially as hereinbefore specified, namely:

1. In a clamping device, the combination of a main nut, and a lock-nut, telescopically connected, and being capable of relative rotation.

2. In a clamping device, the combination of a main nut, and a lock-nut telescopically connected thereto, said nuts being capable of relative rotation, and said lock-nut being closed at its outer end.

3. In a clamping device, the combination of a main nut, and a lock-nut telescopically connected thereto, said nuts being capable of relative rotation, and having an enlarged bore between their screw-threaded portions.

4. In a clamping device, the combination of a main nut, and a lock-nut telescopically connected thereto, one of said nuts having an elongated socket, and the other having an extension entering said socket, and being formed with an enlarged bore.

5. In a clamping device, the nut E having a socket $i$, and the nut F having an extension $j$ formed with an enlarged bore, and adapted to slide in said socket, said nuts being rotatively connected together.

6. The combination with a rod $e$ having screw-threaded portions $f$ and $g$, and an intermediate portion $h$ of reduced diameter, of a pair of nuts telescopically connected together and capable of relative rotation, one adapted to engage the thread $f$ and the other the thread $g$, and one being extended toward the other sufficiently to contact with it when in such engagement, whereby one nut acts as a lock-nut for the other.

In witness whereof we have hereunto signed our names in the presence of two subscribing witnesses.

HARRY K. RAYMOND.
MAXIMILIAN CHARLES SCHWEINERT.
HENRY P. KRAFT.

Witnesses to signature of Raymond:
GEORGE A. SCANLON,
JOHN A. KUEHLBORN.

Witnesses to signatures of Schweinert and Kraft:
DOMINGO A. USINA,
FRED WHITE.